H. FORNCROOK.
Foot Warmer.
No. 13,871.  Patented Dec. 4, 1855.
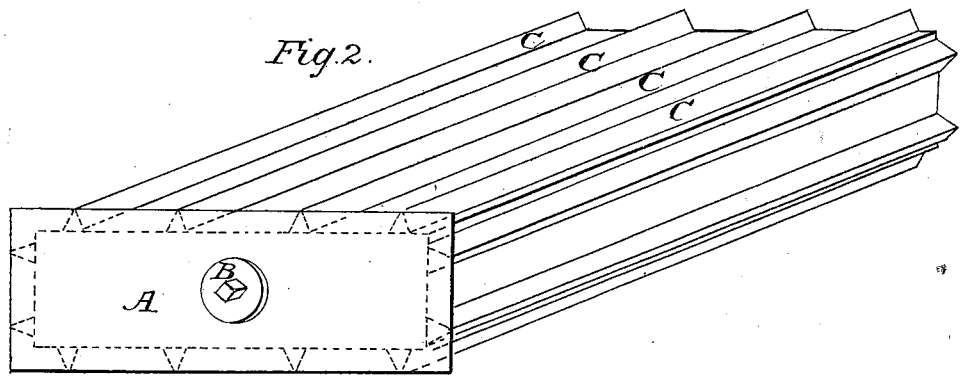
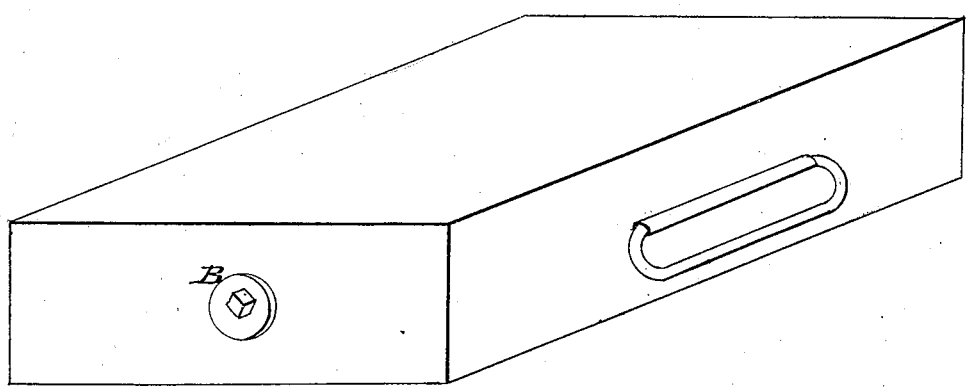

UNITED STATES PATENT OFFICE.

H. FORNCROOK, OF ELBRIDGE, NEW YORK.

FOOT-WARMER.

Specification of Letters Patent No. 13,871, dated December 4, 1855.

*To all whom it may concern:*

Be it known that I, HENRY FORNCROOK, of Elbridge, in the county of Onondaga and State of New York, have invented a new and Improved Foot-Warmer; and I do hereby declare that the following is a full and exact description thereof, reference being had to the accompanying drawings and model and to the letters of reference marked upon said drawings.

The nature of my invention consists in the invention of an article which I call a "foot warmer" to be used for the purpose of warming the feet or hands or beds or to be used for purposes of warmth while traveling or otherwise.

To enable others skilled in the art to make and use my invention, I will proceed to describe its construction.
First, I construct the inner box or reservoir, soldering the supporters to the air chamber on the outside of said inner box or reservoir. I then solder the tube, for the admission of water, to the end piece of the outer box, and also to the end piece of the inner box connecting the said end pieces by said tube. Then I construct the outer box of a size large enough to receive the inner box with the supporters attached, and solder the whole together, attaching convenient handles thereto. When required for use the inner box is to be filled with hot water.

What I claim and desire to secure by Letters Patent is,

The arrangement of the angular supports C upon the inner box, thereby providing the foot warmer with a hot air chamber, also with substantial supports for the outer box, in the manner described for the purposes specified.

HENRY FORNCROOK.

Witnesses:
J. W. HOSFORD,
C. G. McGOWAN.